US011847408B2

(12) United States Patent
Religa et al.

(10) Patent No.: US 11,847,408 B2
(45) Date of Patent: Dec. 19, 2023

(54) DOCUMENT CONTROL ITEM

(71) Applicant: Microsoft Technology Licensing, LLC, Redmond, WA (US)

(72) Inventors: Tomasz Lukasz Religa, Seattle, WA (US); Huitian Jiao, Redmond, WA (US); Abhisaar Sharma, Bellevue, WA (US); Max Wang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/801,899

(22) PCT Filed: Apr. 13, 2021

(86) PCT No.: PCT/US2021/027160
§ 371 (c)(1),
(2) Date: Aug. 24, 2022

(87) PCT Pub. No.: WO2021/195642
PCT Pub. Date: Sep. 30, 2021

(65) Prior Publication Data
US 2023/0082729 A1    Mar. 16, 2023

(30) Foreign Application Priority Data
Mar. 26, 2020   (LU) ........................................ 101705

(51) Int. Cl.
*G06F 17/00*   (2019.01)
*G06F 40/169*   (2020.01)
*G06N 5/022*   (2023.01)

(52) U.S. Cl.
CPC ........... *G06F 40/169* (2020.01); *G06N 5/022* (2013.01)

(58) Field of Classification Search
CPC .... G06F 40/169; G06F 40/106; G06F 40/166; G06F 40/205; G06N 5/022; G06N 5/01
(Continued)

(56) References Cited

U.S. PATENT DOCUMENTS

| 7,937,338 | B2 * | 5/2011 | Boguraev | ............. G06F 40/137 709/205 |
| 8,005,877 | B2 * | 8/2011 | McDonald | ............. G06F 16/93 707/805 |

(Continued)

FOREIGN PATENT DOCUMENTS

WO      2005050474 A2      6/2005

OTHER PUBLICATIONS

Tensmeyer, Training Full-Page Handwritten Text Recognition Models without Annotated Line Breaks', 2019 International Conference on Document Analysis and Recognition (ICDAR), Published 2019 (Year: 2019).*

(Continued)

*Primary Examiner* — Stephen S Hong
*Assistant Examiner* — Matthew J Ludwig
(74) *Attorney, Agent, or Firm* — Schwegman Lundberg Woessner, P.A.

(57) ABSTRACT

A system and method for generating a document control item is described. The system accesses a text document and extracts a portion of the text document. The portion comprises some but not all of the text document. The system sends the portion of the text document to a trained machine learning model and, in response, receives a classification of the portion as demarking a section break. The system modifies the text document by inserting a document control item into the text document at a location of each portion classified as demarking a section break. The system stores the modified document.

13 Claims, 14 Drawing Sheets

(58) Field of Classification Search
USPC .......................................................... 715/230
See application file for complete search history.

(56) References Cited

U.S. PATENT DOCUMENTS

| | | | | |
|---|---|---|---|---|
| 9,058,374 | B2* | 6/2015 | Brennan | G06F 16/24578 |
| 9,514,216 | B2* | 12/2016 | Duan | G06F 16/285 |
| 10,042,928 | B1* | 8/2018 | Brown | G06F 16/35 |
| 10,223,341 | B1* | 3/2019 | Jain | G06F 40/103 |
| 10,380,236 | B1 | 8/2019 | Ganu et al. | |
| 10,678,999 | B2* | 6/2020 | Lemonik | G06F 40/143 |
| 10,867,445 | B1* | 12/2020 | Kraus | G06T 19/006 |
| 10,909,320 | B2* | 2/2021 | Bull | G06F 40/279 |
| 11,204,950 | B2* | 12/2021 | Daboll-Lavoie | G06F 40/295 |
| 11,256,856 | B2* | 2/2022 | Gelosi | G06F 40/131 |
| 11,663,215 | B2* | 5/2023 | Weber | G06F 16/243 |
| | | | | 707/706 |
| 11,714,791 | B2* | 8/2023 | Religa | G06F 16/345 |
| | | | | 707/608 |
| 2013/0007055 | A1* | 1/2013 | Brown | F16H 3/54 |
| | | | | 707/769 |
| 2014/0033069 | A1 | 1/2014 | Chegini et al. | |
| 2014/0380152 | A1 | 12/2014 | Noguchi et al. | |
| 2015/0206447 | A1* | 7/2015 | Vahid | G09B 5/08 |
| | | | | 434/362 |
| 2017/0278514 | A1* | 9/2017 | Mathias | G06F 16/35 |
| 2018/0089373 | A1* | 3/2018 | Matsuguchi | G16H 50/20 |
| 2018/0365229 | A1 | 12/2018 | Buhrmann et al. | |
| 2019/0073354 | A1* | 3/2019 | Indenbom | G06F 40/279 |
| 2020/0110791 | A1* | 4/2020 | Khoo | H04W 84/005 |
| 2021/0034698 | A1* | 2/2021 | Mujumdar | G06V 20/10 |
| 2021/0294901 | A1* | 9/2021 | Agarwwal | H04L 41/145 |
| 2021/0374398 | A1* | 12/2021 | Li | G06V 10/40 |
| 2022/0004645 | A1* | 1/2022 | Agarwwal | H04L 41/046 |

OTHER PUBLICATIONS

"Office Action Issued in European Patent Application No. 21775268. 2", dated Dec. 21, 2022, 5 Pages.

Adebayo, John K., "Multimodal Legal Information Retrieval", In Dissertation Submitted to University of Luxembourg, Apr. 27, 2018, 259 Pages.

"Search Report Issued in Luxembourg Patent Application No. LU101705", dated Oct. 30, 2020, 11 Pages.

"International Search Report and Written Opinion Issued in PCT Application No. PCT/US21/027160", dated Sep. 16, 2021, 9 Pages.

* cited by examiner

DOCUMENT CONTROL ITEM

PRIORITY APPLICATION

This application is a U.S. National Stage Filing under 35 U.S.C. 371 of International Patent Application Serial No. PCT/US2021/027160, filed Apr. 13, 2021, and published as WO 2021/195642 A2 on Sep. 30, 2021, which application claims the benefit of priority to Luxembourg Patent Application No. 101705, filed Mar. 26, 2020, which applications and publication are incorporated herein by reference in their entirety.

TECHNICAL FIELD

The subject matter disclosed herein generally relates to a special-purpose machine that analyzes a text document and modifies the text document with document control items, including computerized variants of such special-purpose machines and improvements to such variants. Specifically, the present disclosure addresses systems and methods for inserting document control items in the text document to facilitate rendering of the text document and/or distribution of the document.

BACKGROUND

A document editing application (e.g., Microsoft Word™) can be used to view a text document by controlling a renderer to render the text document at a display. Document control items are often used within text documents to facilitate control of renderers to achieve appropriate display such as by demarking section breaks. With the increasing use of unstructured text documents which have little or no document control items it is not straightforward to control renderers and other equipment such as printing devices

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
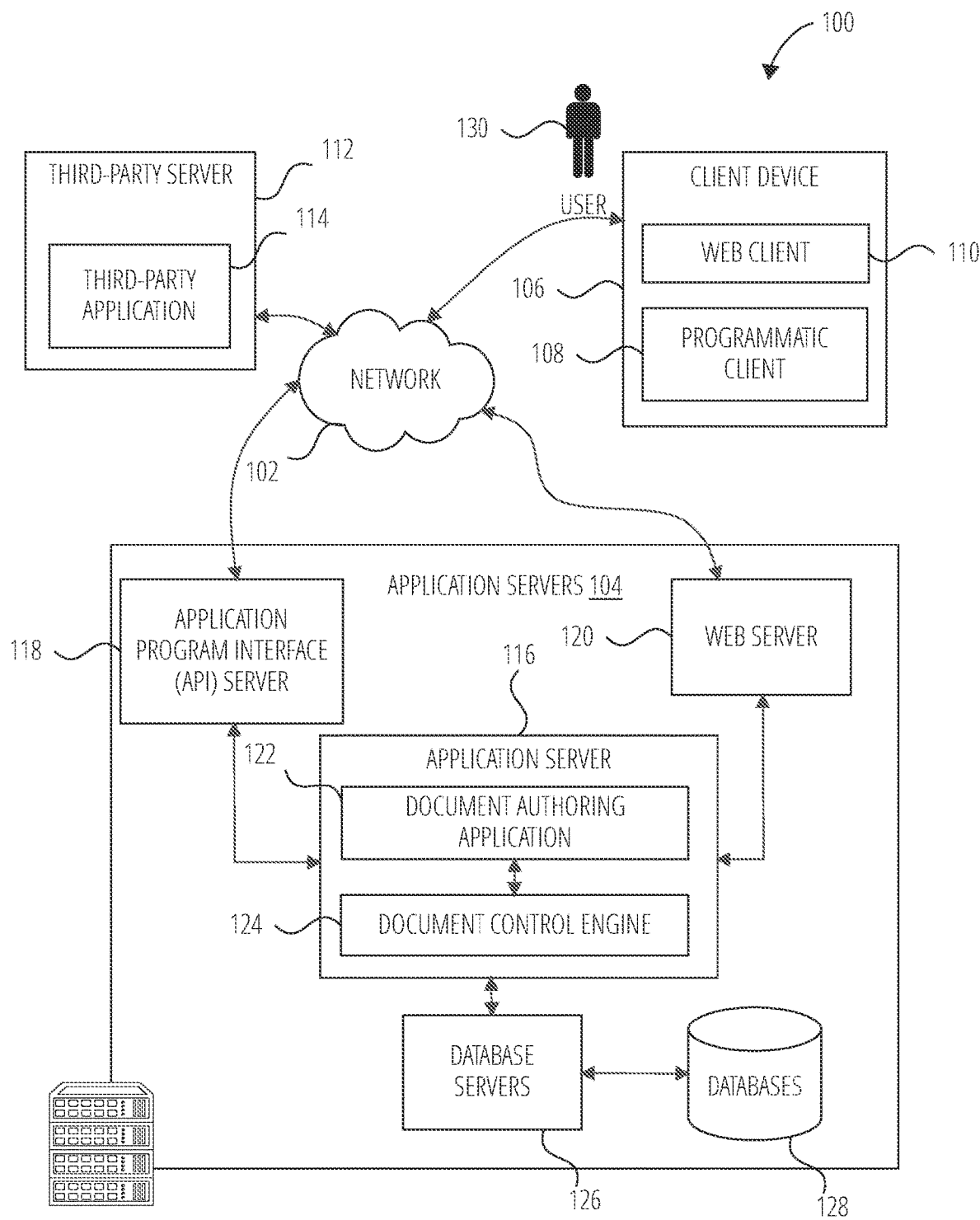
FIG. 1 is a diagrammatic representation of a networked environment in which the present disclosure is deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The term "document control item" is used herein to refer to an instruction embedded in a document and which is interpretable by a document viewing application in order to control one or more processes. Non-limiting examples of processes which are controlled are: how a renderer renders the document at a display, how the document is transmitted over a communications network, how the document is printed, and how the document is stored in a database.

The present application describes a system and method for analyzing a text document and modifying the text document by inserting a document control item that enables a user of a document viewing application (e.g., Microsoft Word™, Microsoft PowerPoint™) to directly access a portion of the text document associated with the document control item (without the user having to scroll through the entire document). The document control item demarks a section break at a location of the portion of the text document. Furthermore, the system generates a label associated with a content of the portion of the text document. The label is associated with the document control item. As such, the system breaks down the text document into separated, logical sections and annotates labels (e.g., section titles) within the text document by inserting document control items.

In one example embodiment, the system extracts portions of the text document. A portion comprises some but not all of the text document. Each portion of the text document is sent to a trained machine learning model. The trained machine learning model generates a classification of the portion as demarking a section break (or not). The system modifies the text document by inserting the document control item into the text document at a location of each portion classified as demarking a section break. In some examples, each document control item controls rendering of the text document before the document control item independently from rendering of the text document after the document control item such that the text document comprises a plurality of sections. The system stores the modified document in a storage device.

In another example embodiment, the system distributes the modified document to a remote computing device by sending the labels and document controls items (of the modified document) to the remote computing device. The system receives a user input that selects one of the labels and associated document control item. In response to receiving the user input, the system sends a section associated with the document control item to the remote computing device. In this way content distribution is facilitated since memory capacity at the receiving device is often limited, such as in the case of smart phones and other resource constrained devices. The document control items which are automatically added to the document enable the document to be distributed in sections which improves efficiency and reduces bandwidth requirements.

In another example embodiment, the system presents one of the labels in a first user interface of a document editing application. The system receives a single user-action that selects the label in the first user interface. In response to receiving the single user-action, the system uses the document control item associated with the label to retrieve the section corresponding to the label. The system then renders the section in a second user interface of the document editing application. By using two user interfaces in this manner, a user has reduced burden of user input to the computing device.

In another example embodiment, the system presents at least one of the labels in a user interface of a document editing application. The system receives a single user-action that selects one of the labels in the user interface. In response to receiving the single user-action, the system retrieves the section corresponding to the label using the document control item associated with the label. The system then renders the section in the user interface of the document editing application. By enabling a single user-action in this manner, a user has reduced burden of user input to the computing device.

In another example embodiment, the system trains the machine learning model using a plurality of text documents that comprise section breaks and associated labels. The machine learning model includes a first machine learning model and a second machine learning model. The first machine learning model classifies a portion as demarking a section break. The second machine learning model classifies a section of the text document into one of a plurality of possible classes. Each class includes a section label.

In another example embodiment, the system extracts the portions by dividing the document into a sequence of portions and sends the portion together with a plurality of immediately previous and immediately subsequent portions of the sequence to the trained machine learning model. Using a machine learning model is found to be an efficient way of predicting where document control items are to be added to a text document. Alternatives such as adding a document control items after a specified number of words are inferior since it is harder in that case to appropriately render, distribute or print sections of the document. The end result is a better computer which is able to cope with unstructured text documents which have few or no document control items.

In another example embodiment, the system forms an outline section of the modified text document based on the document control items and the labels. The outline section comprises the labels. The system receives a request to render the outline section. In response to receiving the request, the system renders the outline section. The system receives a selected label of the plurality of labels and identifies the document control item corresponding to the selected label and renders a section of the document corresponding to the selected label using the document control item.

In another example embodiment, the system presents a candidate document control item location to a user and modifies the document by inserting the document control item at the location only if the candidate document control item is selected by the user. In this way burden of user input is reduced. A user does not have to manually locate positions for document control items since the user is offered candidates which are then selected by the user.

As a result, one or more of the methodologies described herein facilitate solving the technical problem of navigating to a portion of a document based on generated labels. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 110 (e.g., a browser operating a web version of an enterprise application), a programmatic client 108 (e.g., a client-side enterprise document application such as Microsoft PowerPoint™) that is hosted and executed on the client device 106. In one example embodiment, the programmatic client 108 includes a document viewing application (not shown) renders a modified document for viewing (and editing). For example, the document viewing application receives a request to access a text document stored at the databases 128 or locally at the client device 106. The text document includes several paragraphs but without any headings or labels corresponding to the paragraphs. The document viewing application accesses a modified version of the text document and displays the modified version at the client device 106. The modified version includes document control items which demark section breaks and associated labels inserted in the text document.

An Application Program Interface (API) server 118 and a web server 120 provide respective programmatic and web interfaces to application servers 104. A specific application server 116 hosts a document authoring application 122 and a document control engine 124. Both the document authoring application 122 and the document control engine 124 include components, modules and/or applications.

The document authoring application 122 includes a document authoring/editing application (e.g., Microsoft PowerPoint™, Microsoft Word™) that enables the user 130 to generate and view content such as a presentation document, or a text document. In another example, the document authoring application 122 also includes a collaborative application that enables peer enterprise users to collaborate on a shared document. For example, the client device 106 accesses the document authoring application 122 to view and edit a document that is shared with other peer users. Other examples of document authoring application 122 includes enterprise systems, content management systems, and knowledge management systems. The document authoring application 122 communicates with the programmatic client 108 on the client device 106. For example, the programmatic client 108 checks in with the document authoring application 122 and verifies a validity of a license or version of the programmatic client 108 on the client device 106. In another example embodiment, the programmatic client 108 includes at least one of a content creation application, a collaborative application, and a shared storage application.

The document control engine 124 accesses a text document from the document authoring application 122. The text document includes unorganized paragraphs (e.g., paragraphs without document control items). The document control engine 124 modifies the text document to demark section breaks (between paragraphs in the text document) and insert labels corresponding to the demarked sections in the modified text document. In one example, the document control engine 124 accesses a text document that contains several paragraphs without any paragraph titles or headings. The document control engine 124 extracts a section from the text document to determine whether to demark a section break between two paragraphs in the section. The section includes two or more paragraphs. The document control engine 124 further generates a label indicative of the content of the paragraph(s) in the section and associates the label with the paragraph(s).

In one example embodiment, the document control engine 124 trains a machine learning model based on features of documents from a library of training documents stored in databases 128. The features include keywords and labels preceding a paragraphs in the training documents. The document control engine 124 uses the machine learning model to classify a section as whether to demark a section break. The document control engine 124 also uses the machine learning model to identify a label that describes the paragraph(s) associated with the section break.

In one example embodiment, the document control engine 124 generates a document control item that identifies the section breaks and the label corresponding to a section. For example, the document control item includes metadata that identify the section breaks and label(s) in the text document. For example, the metadata include a section break attribute that identifies a location of a section break in the text document, and a label attribute that identifies a label associated with the section break. A value of the label attribute is based on the content of the paragraph immediately after the section break.

In another example, the document control item includes a location marker within the text document to allow the user to directly navigate to a section (corresponding to the location marker) of the text document by identifying the location marker corresponding to a selected label. Other examples of document control items include a location pin, position marker, a place marker, a hidden user interface element, a paragraph identifier, or any other location identifiers inserted in the text document. For example, the location identifiers are defined in a property (e.g., metadata) of the text document. The document control item may be visible or hidden to a user of the document authoring application 122.

In one example embodiment, the web client 110 communicates with the document control engine 124 and document authoring application 122 via the programmatic interface provided by the Application Program Interface (API) server 118. In another example embodiment, the document control engine 124 modifies documents (e.g., modify metadata of the document) and provides the modified document to the document authoring application 122 or the client device 106. The document authoring application 122 or the programmatic client 108 renders a display of the modified document in one or more panes of a user interface of the document authoring application 122 or programmatic client 108. For example, the document authoring application 122 renders a list of labels for a modified document in a first pane, and the text of the modified document in a second pane. When the user selects a label in the first pane, the section corresponding to the label is displayed in the second pane.

The application server 116 is shown to be communicatively coupled to database servers 126 that facilitates access to an information storage repository or databases 128. In one example embodiment, the databases 128 includes storage devices that store documents to be processed by the document authoring application 122. For example, the databases 128 include a library of documents (e.g., training text documents, modified documents, documents that are shared with the user 130, documents that are shared by the user 130, documents that are accessed, authored, or edited by the user 130 using the web client 110, the programmatic client 108, or the document authoring application 122).

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, supports one or more features or functions on a website hosted by the third party. For example, the third-party application 114 retrieves a text document and provides the text document to the document control engine 124. The document control engine 124 modifies the text document and provides the modified text document to the client device 106.

Figure 2:
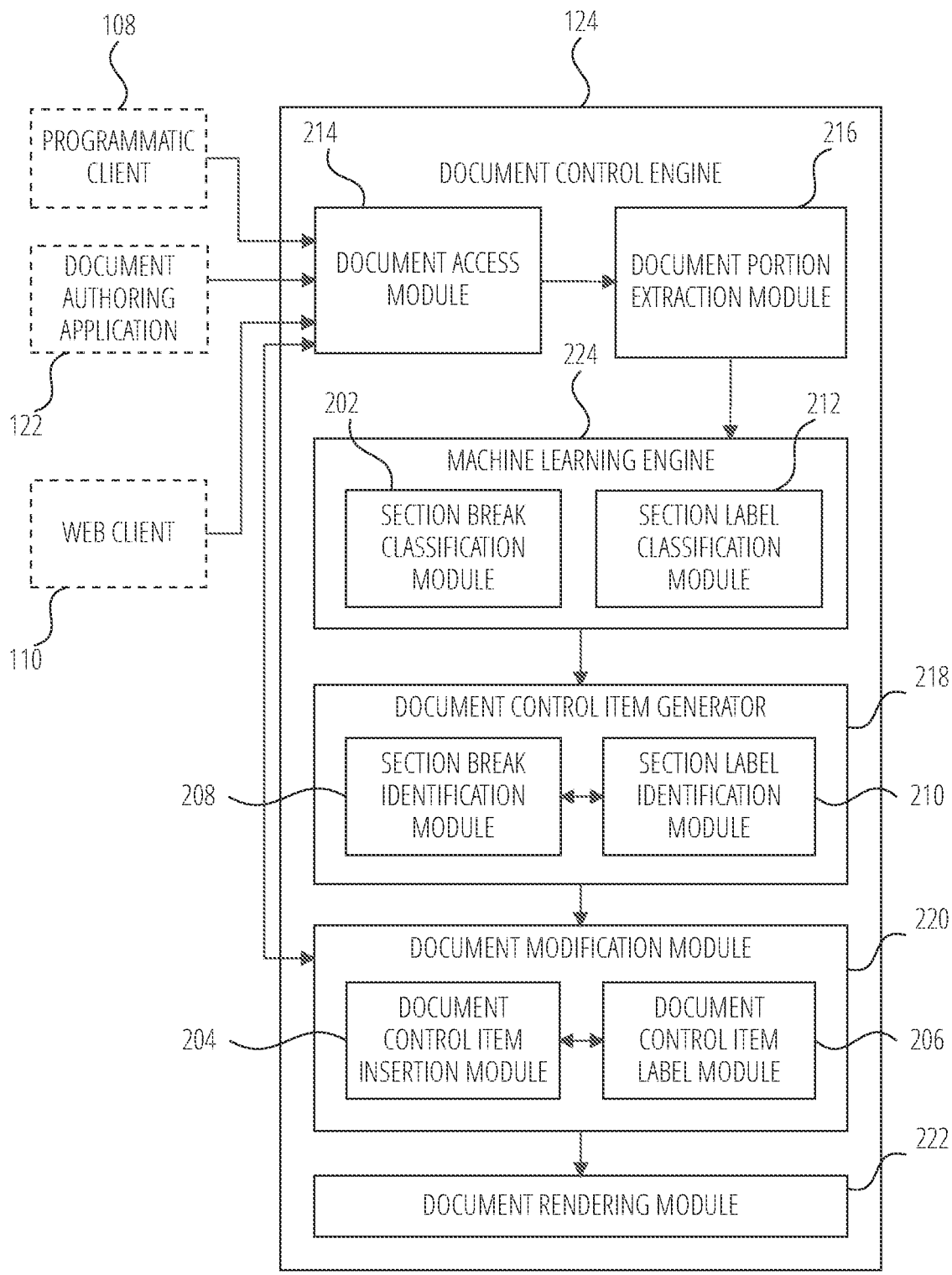
FIG. 2 is a block diagram illustrating a document control engine in accordance with one example embodiment.

FIG. 2 is a block diagram illustrating a document control engine 124 in accordance with one example embodiment. The document control engine 124 comprises a section break classification module 202, a section label classification module 212, a document access module 214, a document portion extraction module 216, a document control item generator 218, a document modification module 220, a document rendering module 222, and a machine learning engine 224.

The document access module 214 retrieves a text document accessed by the programmatic client 108, the document authoring application 122, or the web client 110. In another example, the document access module 214 accesses the text document stored in the databases 128 or at the client device 106. In another example, the document access module 214 detects that a text document is being accessed/viewed/edited by the programmatic client 108, document authoring application 122, or the web client 110. In response to the detection, the document access module 214 accesses the text document that is being accessed/viewed/edited and provides the text document to the document portion extraction module 216.

The document portion extraction module 216 extracts a portion of the text document. The portion includes some but not all of the text document. The text document includes one or more paragraphs without a header or label associated with one or more paragraphs. In one example, the document portion extraction module 216 parses the text document and extracts one or more paragraphs from the text document. The document portion extraction module 216 sends the portion of the text document (e.g., one or more paragraphs) to the machine learning engine 224.

The machine learning engine 224 operates using pattern detection algorithms and trained Machine Learning (ML) models to identify section boundaries and corresponding section titles in the text document. For example, the machine learning engine 224 includes a trained machine learning model that receives the portion of the text document, analyzes the portion of the text document, and generates a classification of the portion as demarking a section break (or not). The machine learning engine 224 receives a portion that includes two paragraphs (e.g., one paragraph immediately following another paragraph) from the text document. The machine learning engine 224 uses the trained machine learning model to determine whether to demark a section break between the two paragraphs in the text document.

In another example embodiment, the machine learning engine 224 includes a section break classification module 202 and a section label classification module 212. The section break classification module 202 includes a trained machine learning model (also referred to as "section boundary" model) that determines a beginning of new section within the document. The section label classification module 212 includes a trained machine learning model that predicts a label for a title of the section (also referred to as "section title" model).

In one example embodiment, for both models (e.g., "section boundary" and "section title"), the machine learning engine 224 trains a deep neural network (DNN) with the following layers: Embedding→(Convolutional, MaxPooling)×2→Dropout→Dense→Dense. In the "section boundary" model, the output of the section break classification module 202 is a binary classifier that determines the probability that a new section starts (e.g., demarking a section break). In the "section title" model, the output of the section label classification module 212 is a multi-class classifier that determines one of the top 1000 possible titles (based on the training data). In another example embodiment, other alternative implementation of the section break classification module 202 include rule-based approaches, unsupervised learning or other supervised machine learning methods (e.g., decision trees, support vector machines). Alternative embodiments of the section label classification module 212 for the "section title" model include using language generation models, such as Bi-directional encoder representations (BERT) or Generative Pretrained Transformer 2 (GPT-2).

In one example embodiment, the DNN is trained based on a publicly available content (e.g., public library of text documents) retrieved from the internet. For example, the machine learning engine 224 processes the publicly available content and outputs text in each paragraph excluding the heading paragraphs. Then, the machine learning engine 224 trains the "section boundary" model on whether a heading was available in the original dataset. The "section title" model is similarly trained on the text content of the locations in a multi-class approach. In one example, to improve the quality of the predictions, the machine learning engine 224 uses text information from five paragraphs before and five paragraphs after the location of interest. As such, to predict whether a section title is needed at a particular location (for the "section boundary" model), the machine learning engine 224 uses text from paragraphs N−5, N−4, N−3, N−2, N−1, N+0, N+1. N+2, N+3, N+4. For the "section title" model, the machine learning engine 224 identifies for keywords used in the same paragraph.

In another example embodiment, the machine learning engine 224 trains the "section boundary" model using actual text document datasets where the headings (which are either explicitly or implicitly mentioned) are removed. Moreover, the machine learning engine 224 obtains training data for supervised learning from other public databases (e.g. newspaper databases, legal document databases, research article databases). In another example, the machine learning engine 224 train the "section boundary" model directly from user input collected from the document authoring application 122. In other examples, the machine learning engine 224 trains personalized models by using user-specific documents (e.g., documents authored or viewed by the user 130).

In another example embodiment, if the "section boundary" model is unable to classify a section to demark with the section breaks with high enough confidence, the section break classification module 202 creates section breaks every fixed number of paragraphs or divides the text document into a fixed number of sections. Similarly, in case the "section title" model is unable to predict a label (e.g., section title) with high confidence, the section label classification module 212 uses the section's first sentence as its summary or use unsupervised learning to determine the most representative word, phrase or sentence from the section. The results of the both models is used to suggest to the user 130, a location of such section titles or their content.

In one example embodiment, the results of the model prediction from section break classification module 202 and section label classification module 212 are served by a REST call at the document control engine 124 of the application server 116. In another example, the "section boundary" model and the "section title" model are stored on the client device 106.

The document control item generator 218 generates a document control item that identifies a section break and a label (e.g., section title) associated with the paragraph immediately following the section break. For example, the document control item includes metadata that identifies the section breaks and label(s) in the text document. The metadata include a section break attribute that identifies a location of a section break in the text document, and a label attribute that identifies a label associated with the section break. A value of the label attribute is based on the content of the paragraph immediately after the section break.

In one example embodiment, the document control item generator 218 includes a section break identification module 208 and a section label identification module 210. The section break identification module 208 identifies a section break and generates a value for the section break attribute of the metadata. The value indicates a location (e.g., between paragraph x and paragraph x+1) of the section break in the text document.

In another example embodiment, the document control item generator 218 includes a link feature that identifies a location of a section associated with a label. For example, when the user selects the label (displayed in a user interface that lists all the labels of the text document), the document control item generator 218 identifies the location of the section associated with the selected label and causes the document authoring application 122 to navigate to the location and display the section in a graphical user interface.

In another example, the section break identification module 208 generates a document control item that includes a location marker within the text document to allow the user to directly navigate to a section (corresponding to the location marker) of the text document by identifying the location marker corresponding to a selected label. Other examples of document control items include a location pin, position marker, a place marker, a hidden user interface element, a paragraph identifier, or any other location identifiers inserted in the text document. For example, the location identifiers may be defined in a property (e.g., metadata) of the text document.

The section label identification module 210 generates a label (e.g., a header title, a paragraph heading) for one or more paragraph immediately preceding the section break. For example, the section label identification module 210 generates a value for the label attribute of the metadata. The value of the label attribute includes one or more keywords or a paragraph title that is based on the content of the paragraph(s) immediately after the section break.

The document modification module 220 modifies the text document by inserting/embedding the document control item(s) in the text document. In one example embodiment, the document modification module 220 includes a document control item insertion module 204 and a document control item label module 206. The document control item insertion module 204 modifies metadata of the text document by including a section break attribute that identifies a location of a section break in the text document. The document control item label module 206 modifies metadata of the text document by including a label attribute that identifies a label associated with the section break (or associated with the paragraph(s) following the section break). In one example, the document modification module 220 replaces a content of the text document with the modified text document (e.g., original text document modified with added sections breaks and added section labels/paragraph titles). In another example, the document modification module 220 retains the original content of the text document but only modifies metadata of the text document. In another example, the document modification module 220 modifies the content of the text document and modifies the metadata of the text document.

The document modification module 220 stores the modified text document in the databases 128. The document modification module 220 communicates the modified text document to the document rendering module 222.

The document rendering module 222 renders the modified text document at the client device 106. In one example, the document rendering module 222 renders the modified text document to be displayed at the client device 106. In another example, the document rendering module 222 communicates the modified text document to the document authoring application 122 or to the programmatic client 108.

Figure 3:
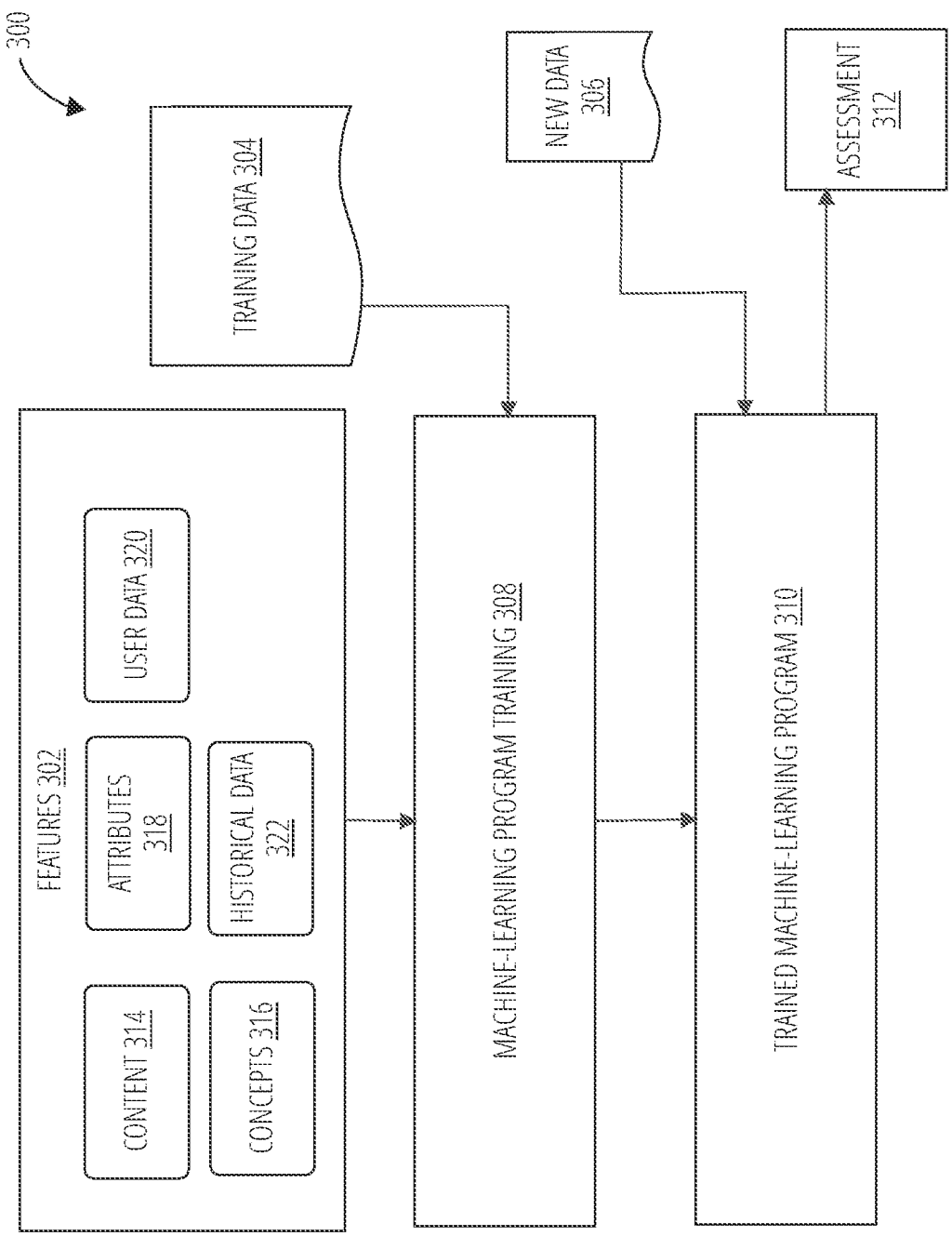
FIG. 3 illustrates training and use of a machine-learning program, according to some example embodiments.

FIG. 3 illustrates training and use of a machine-learning program 300, according to some example embodiments. In some example embodiments, machine-learning programs (MLPs), also referred to as machine-learning algorithms or tools, are used to perform operations associated with searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 304 (e.g., text documents that include paragraph labels/titles/headings) in order to make data-driven predictions or decisions expressed as outputs or assessments (e.g., assessment 312—such as whether to demark a section break between two paragraphs and identify a label that is indicative of content in one or more paragraphs immediately following the section break). Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring section breaks and keywords.

Two common types of problems in machine learning are classification problems and regression problems. Classification problems, also referred to as categorization problems, aim at classifying items into one of several category values (for example, demark as section break or not demark as section break). Regression algorithms aim at quantifying some items (for example, by providing a value that is a real number).

The machine-learning algorithms use features 302 for analyzing the data to generate an assessment 312. Each of the features 302 is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example embodiment, the features 302 may be of different types and include one or more of content 314 (e.g., common words used in two or more consecutive paragraphs), concepts 316 (e.g., keywords), attributes 318, historical data 322 and/or user data 320 (e.g., user-style such as "in conclusion"), merely for example.

The machine-learning algorithms use the training data 304 to find correlations among the identified features 302 that affect the outcome or assessment 312. In some example embodiments, the training data 304 includes labeled data, which is known data for one or more identified features 302 and one or more outcomes, such as detecting communication patterns, detecting the meaning of a portion of a text document, generating a summary of the portion of the text document, detecting action items in messages detecting urgency in the message, detecting a relationship of the user to the sender, calculating score attributes, calculating message scores, identifying keywords, etc.

With the training data 304 and the identified features 302, the machine-learning tool is trained at machine-learning program training 308. The machine-learning tool appraises the value of the features 302 as they correlate to the training data 304. The result of the training is the trained machine-learning program 310.

In one example embodiment, for both models (e.g., "section boundary" and "section title"), the machine-learning program training 308 trains a deep neural network (DNN) with the following layers: Embedding→(Convolutional, MaxPooling)×2→Dropout→Dense→Dense. In the "section boundary" model, the output of the trained machine-learning program 310 is a binary classifier that determines the probability that a new section starts (e.g., demarking a section break). In the "section title" model, the output of the trained machine-learning program 310 is a multi-class classifier that determines one of the top 1000 possible titles or labels.

In another example embodiment, other alternative implementation of the machine-learning program training 308 include rule-based approaches, unsupervised learning or other supervised machine learning methods (e.g., decision trees, support vector machines). Alternative embodiments of the machine-learning program training 308 for the "section title" model include using language generation models, such as BERT or GPT-2.

When the trained machine-learning program 310 is used to perform an assessment, new data 306 (e.g., text document without one or more paragraph headings) is provided as an input to the trained machine-learning program 310, and the trained machine-learning program 310 generates the assessment 312 (e.g., section break, and section label) as output.

Figure 4:
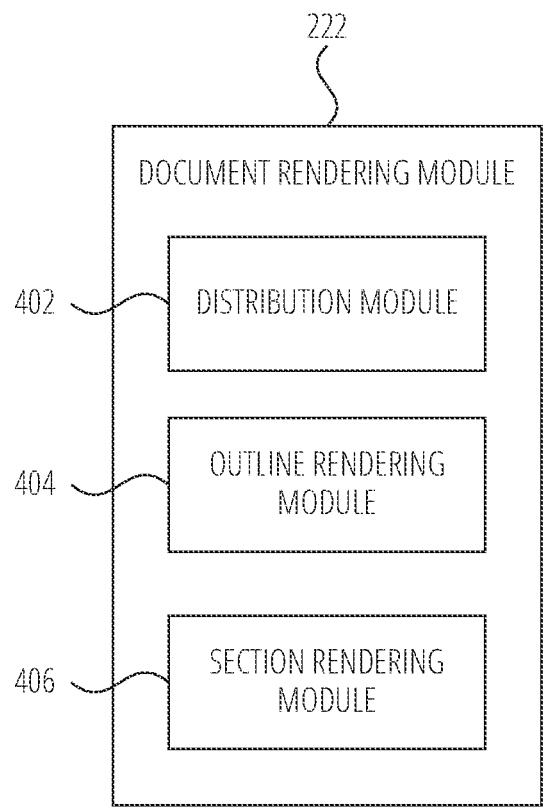
FIG. 4 illustrates a document rendering module in accordance with one example embodiment.

FIG. 4 illustrates a document rendering module 222 in accordance with one example embodiment. The document rendering module 222 includes a distribution module 402, an outline rendering module 404, and a section rendering module 406.

The distribution module 402 receives the modified text document (e.g., modified content with the original metadata, modified content with modified metadata, original content with modified metadata) from the document modification module 220. In one example embodiment, the distribution module 402 distributes the modified document to the client device 106 by sending the modified content of text document with the original metadata of the text document to the client device 106, by sending only the labels and document control items (e.g., modified metadata) to the client device 106, or by sending both the modified content of the text document with the labels and document controls (e.g., modified metadata).

In one example embodiment, the distribution module 402 presents a candidate document control item (e.g., suggested section break and corresponding suggested label) to the client device 106. The user 130 selects and confirms the candidate document control item (and/or label) at the client device 106. In response to the user 130 confirming the candidate document control item, the document modification module 220 modifies the text document by inserting the selected document control item in the text document (e.g., modifying the metadata and/or adding a section break in the text document).

In one example embodiment, the distribution module 402 receives user input selecting one of the labels (and/or associated document control item). The distribution module 402 uses the document control item to identify and retrieve the section associated with the selected label. The distribution module 402 sends the identified section to the computing device.

The outline rendering module 404 presenting one of the labels in a first user interface of the document authoring application 122 (or the programmatic client 108 or the web client 110). The document authoring application 122 receives a single user-action that selects the label in the first user interface. In response to receiving the single user-action, the outline rendering module 404 uses the document control item associated with the selected label to retrieve the section (e.g., one or more paragraphs) corresponding to the label. The outline rendering module 404 renders the section in a second user interface of the document authoring application 122.

In another example embodiment, the outline rendering module 404 forms an outline section of the modified text document based on the document control items and the labels. The outline section includes a list of the labels associated with the modified text document. The outline rendering module 404 receives a request to render the outline section from the document authoring application 122. In response to receiving the request, the outline rendering module 404 renders the outline section. The outline rendering module 404 detects a selected label from the outline section. The outline rendering module 404 identifies the document control item corresponding to the selected label. In response to receiving the selected label, the outline rendering module 404 renders a section of the text document corresponding to the selected label using the document control item.

The section rendering module 406 is configured to present at least one of the labels in a user interface of the document authoring application 122. The section rendering module 406 detects that the document authoring application 122 has received a single user-action that selects one of the labels in the user interface. In response to receiving the single user-action, the section rendering module 406 retrieves the section corresponding to the label using the document control item associated with the label. The section rendering module 406 renders the section in the user interface of the document authoring application 122.

Figure 5:
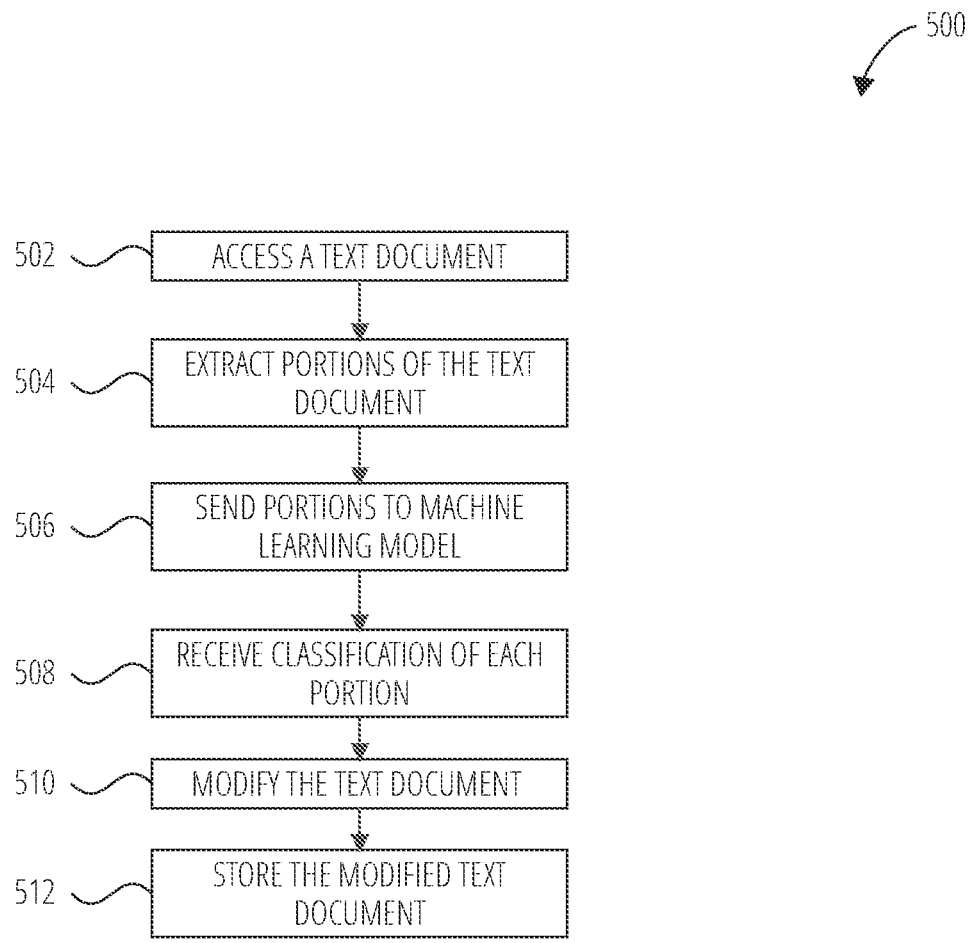
FIG. 5 is a flow diagram illustrating a method for modifying a document in accordance with one example embodiment.

FIG. 5 is a flow diagram illustrating a method for modifying a document in accordance with one example embodiment. Operations in the method 500 are performed by the document control engine 124, using components (e.g., modules, engines) described above with respect to FIG. 2. Accordingly, the method 500 is described by way of example with reference to the document control engine 124. However, it shall be appreciated that at least some of the operations of the method 500 are deployed on various other hardware configurations or be performed by similar components residing elsewhere. For example, some of the operations are performed at the client device 106.

At block 502, the document access module 214 accesses a text document from the programmatic client 108, document authoring application 122, web client 110, or the databases 128. At block 504, the document portion extraction module 216 extracts portions of the text document (e.g., one or more paragraphs). At block 506, the document portion extraction module 216 sends portions of the text document to the machine learning engine 224. At block 508, the document control item generator 218 receives a classification for each portion. At block 510, the document modification module 220 modifies the text document. At block 512, the document modification module 220 stores the modified text document in a storage device (e.g., databases 128).

Figure 6:
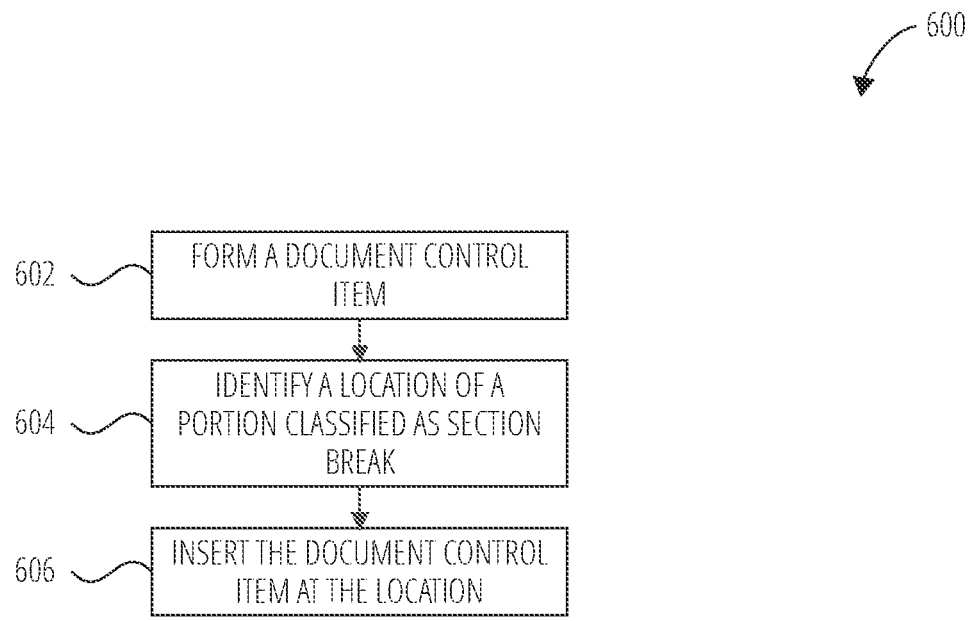
FIG. 6 is a flow diagram illustrating a method for modifying a document in accordance with one example embodiment.

FIG. 6 is a flow diagram illustrating a method for modifying a document in accordance with one example embodiment. Operations in the method 600 are performed by the document control engine 124, using components (e.g., modules, engines) described above with respect to FIG. 2. Accordingly, the method 600 is described by way of example with reference to the document control engine 124. However, it shall be appreciated that at least some of the operations of the method 600 are deployed on various other hardware configurations or be performed by similar components residing elsewhere. For example, some of the operations are performed at the client device 106 or third-party application 114.

At block 602, the document control item generator 218 forms a document control item. At block 604, the document modification module 220 identifies a location of a portion classified as demarked section break. At block 606, the document modification module 220 inserts the document control item at the location of the portion classified as demarked section break.

Figure 7:
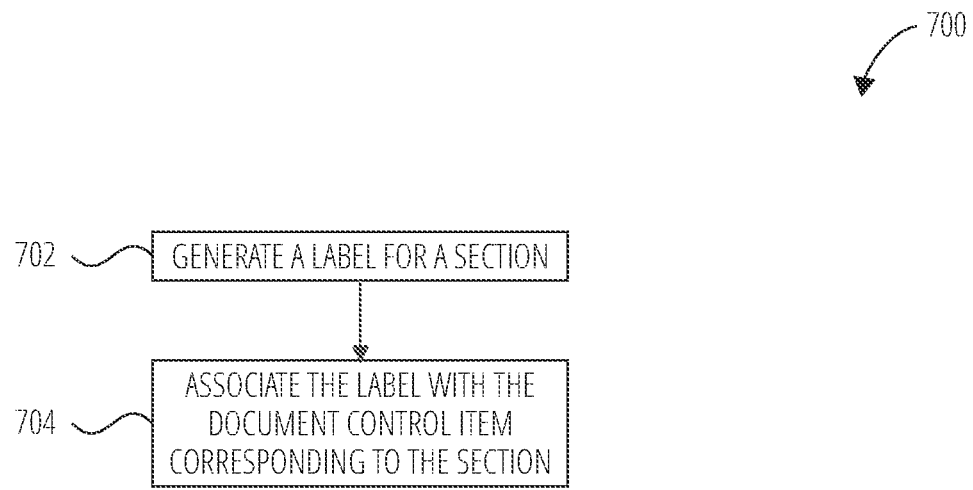
FIG. 7 is a flow diagram illustrating a method for generating a label in accordance with one example embodiment.

FIG. 7 is a flow diagram illustrating a method 700 for computing a reuse score for a document in accordance with one example embodiment. Operations in the method 700 are performed by the document control engine 124, using components (e.g., modules, engines) described above with respect to FIG. 2. Accordingly, the method 700 is described by way of example with reference to the document control engine 124. However, it shall be appreciated that at least some of the operations of the method 700 are deployed on various other hardware configurations or be performed by similar components residing elsewhere. For example, some of the operations are performed at the client device 106 or third-party application 114.

At block 702, the section label identification module 210 generates a label for a section. At block 704, the document control item label module 206 associates the label with the document control item corresponding to the section.

Figure 8:
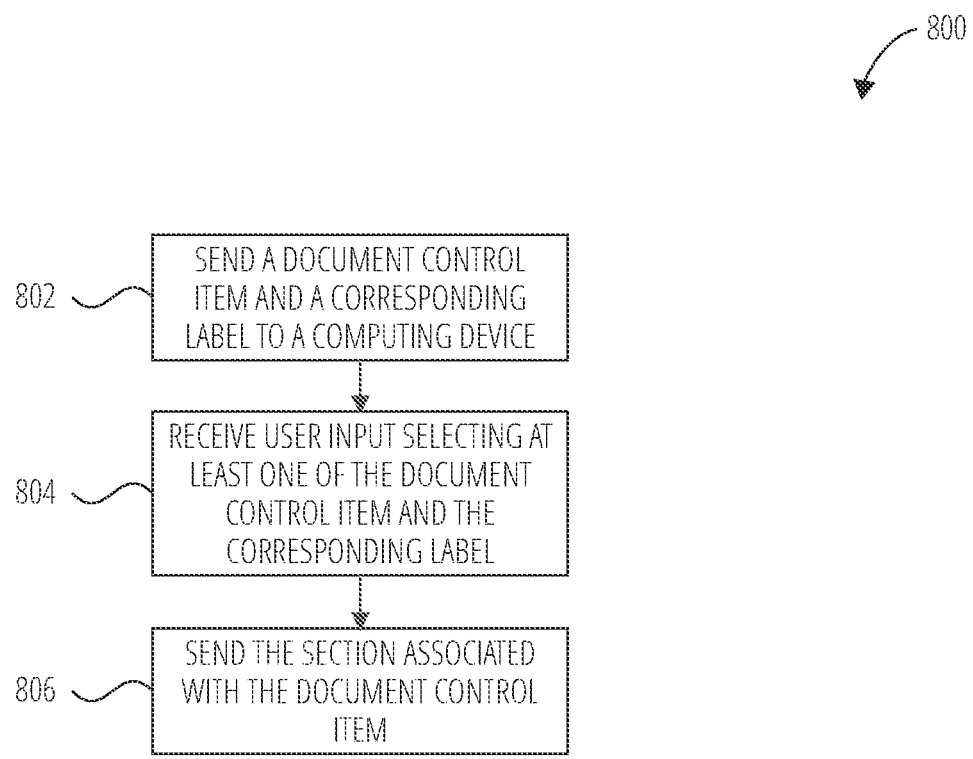
FIG. 8 is a flow diagram illustrating a method for sending a section of a document in accordance with one example embodiment.

FIG. 8 is a flow diagram illustrating a method for sending a section of a document in accordance with one example embodiment. Operations in the method 800 are performed by the document rendering module 222, using components (e.g., modules, engines) described above with respect to FIG. 4. Accordingly, the method 800 is described by way of example with reference to the document rendering module 222. However, it shall be appreciated that at least some of the operations of the method 800 are deployed on various other hardware configurations or be performed by similar components residing elsewhere. For example, some of the operations are performed at the client device 106 or third-party application 114.

At block 802, the distribution module 402 sends a document control item and a corresponding label to a computing device. At block 804, the distribution module 402 receives user input selecting at least one of the document control item and the corresponding label. At block 806, the distribution module 402 sends the section associated with the document control item.

Figure 9:
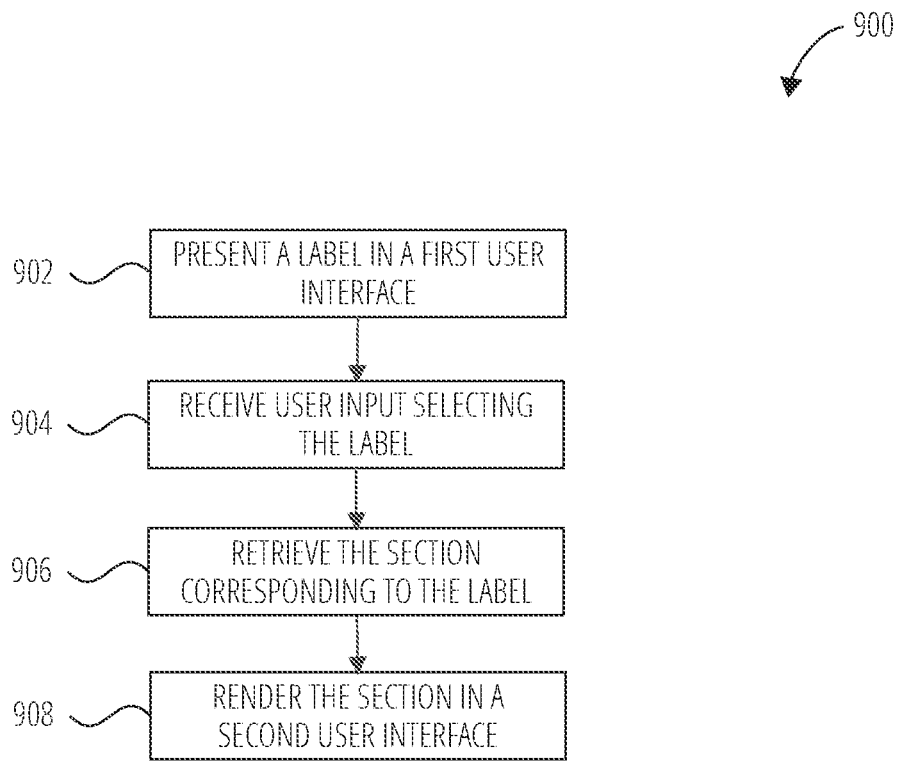
FIG. 9 is a flow diagram illustrating a method for rendering a section of a document in accordance with one example embodiment.

FIG. 9 is a flow diagram illustrating a method for rendering a section of a document in accordance with one example embodiment. Operations in the method 900 are performed by the document rendering module 222, using components (e.g., modules, engines) described above with respect to FIG. 4. Accordingly, the method 900 is described by way of example with reference to the document rendering module 222. However, it shall be appreciated that at least some of the operations of the method 900 are deployed on various other hardware configurations or be performed by similar components residing elsewhere. For example, some of the operations are performed at the client device 106 or third-party application 114.

At block 902, the section rendering module 406 presents a label in a first user interface of the document authoring application 122. At block 904, the section rendering module 406 receives a user input selecting the label. At block 906, the section rendering module 406 retrieves a section corresponding to the label. At block 908, the section rendering module 406 renders the section in a second user interface of the document authoring application 122.

Figure 10:
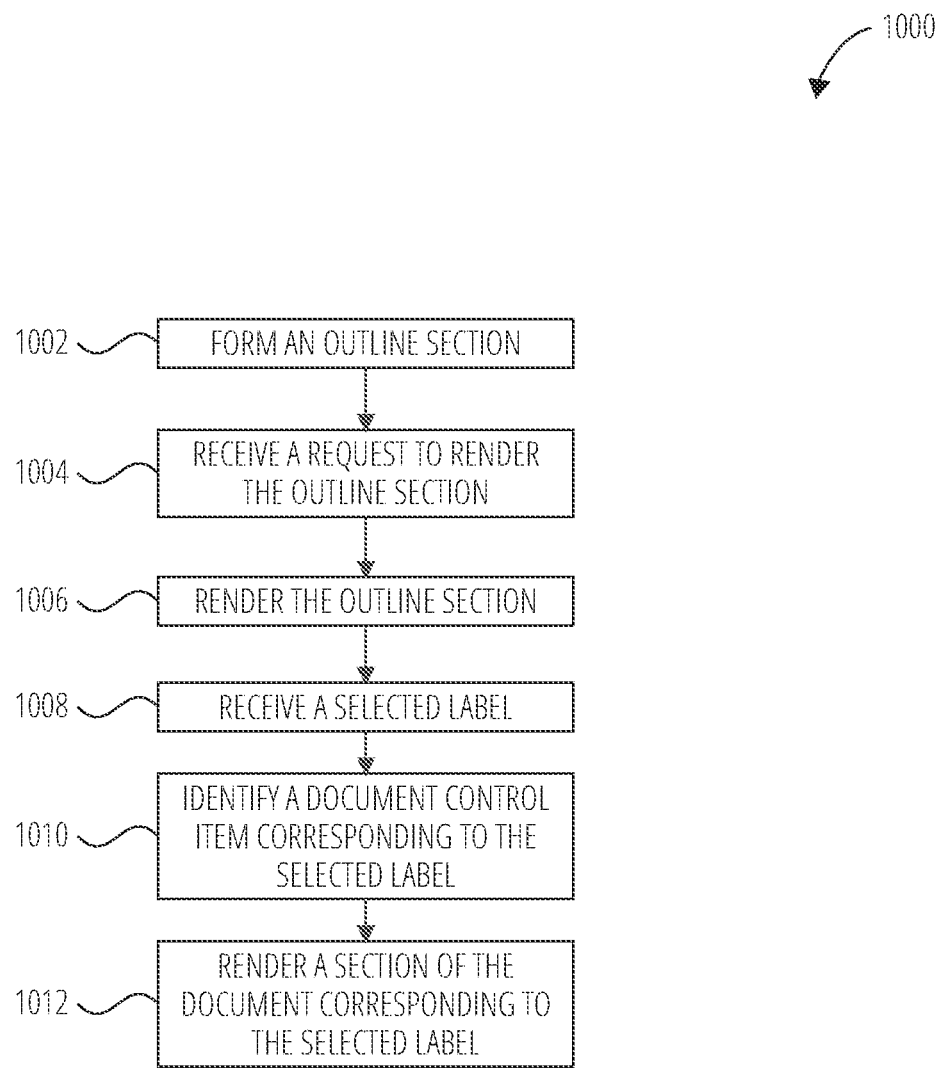
FIG. 10 is a flow diagram illustrating a method for rendering a section of a document in accordance with one example embodiment.

FIG. 10 is a flow diagram illustrating a method for rendering a section of a document in accordance with one example embodiment. Operations in the method 1000 are performed by the document rendering module 222, using components (e.g., modules, engines) described above with respect to FIG. 4. Accordingly, the method 1000 is described by way of example with reference to the document rendering module 222. However, it shall be appreciated that at least some of the operations of the method 1000 are deployed on various other hardware configurations or be performed by similar components residing elsewhere. For example, some of the operations are performed at the client device 106 or third-party application 114.

At block 1002, the outline rendering module 404 forms an outline section. At block 1004, the outline rendering module 404 receives a request to render the outline section. At block 1006, the outline rendering module 404 renders the outline section. At block 1008, the outline rendering module 404 receives a selected label. At block 1010, the outline rendering module 404 identifies a document control item corresponding to the selected label. At block 1012, the outline rendering module 404 renders a section of the document corresponding to the selected label.

Figure 11:
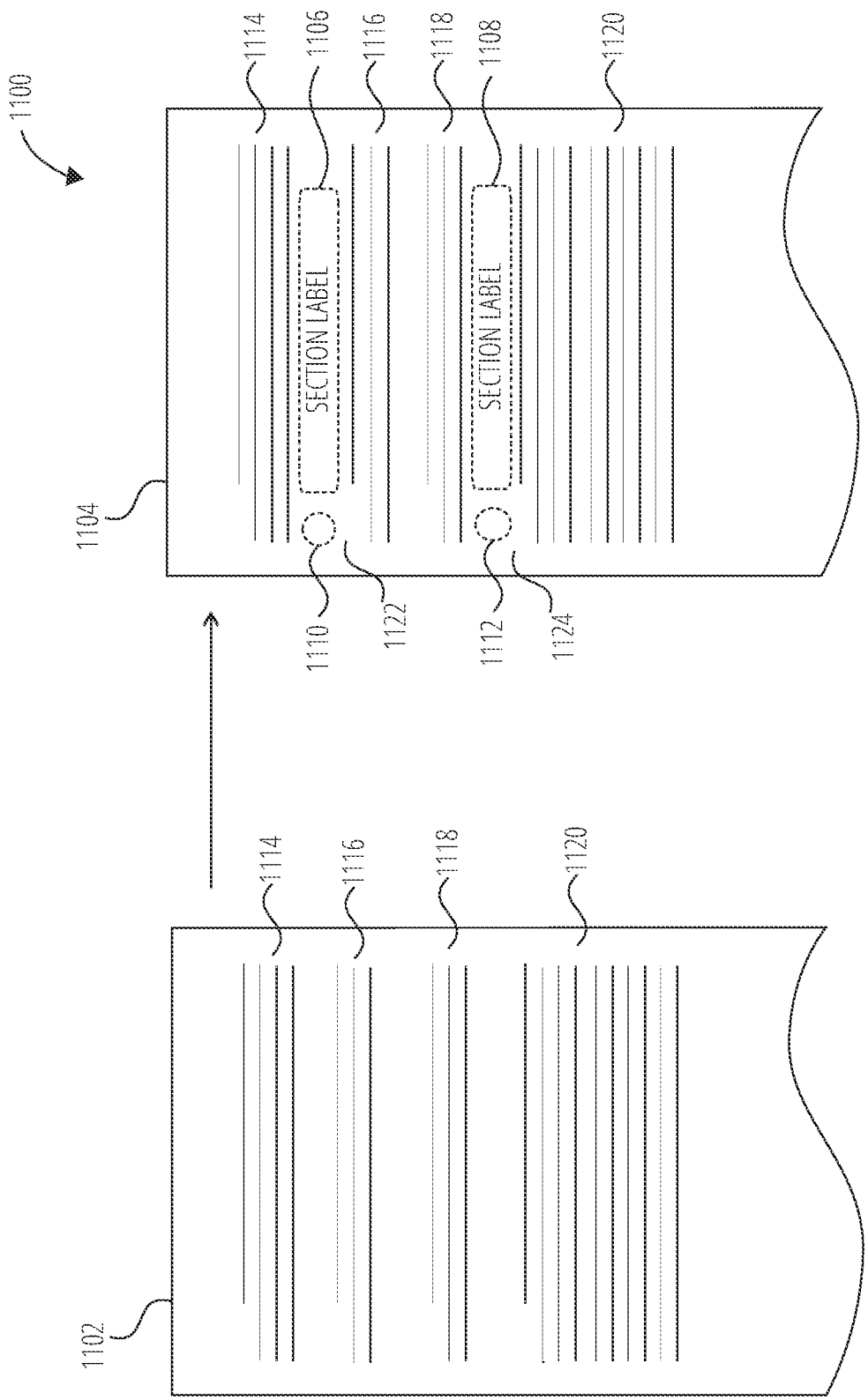
FIG. 11 is a diagram illustrating an example of modifying a document in accordance with one example embodiment.

FIG. 11 is a diagram 1100 illustrating an example of modifying a text document in accordance with one example embodiment. A text document (e.g., original document 1102) includes several paragraphs (e.g., paragraph 1114, paragraph 1116, paragraph 1120, paragraph 1120, and paragraph 1118). The document control engine 124 processes the original document 1102 to generate a modified document 1104.

The modified document 1104 inserts a section break 1122 between paragraph 1114 and paragraph 1116. At the location of the section break 1122, the modified document 1104 includes a section label 1106 that is based on the content from paragraph 1116 and paragraph 1118. The document control engine 124 inserts a document control item 1110 associated with the section break 1122, section label 1106, paragraph 1116, and paragraph 1118.

In another example, the modified document 1104 inserts a section break 1124 between paragraph 1118 and paragraph 1120. At the location of the section break 1124, the modified document 1104 includes a section label 1108 that is based on the content from paragraph 1120. The document control engine 124 inserts a document control item 1112 associated with the section break 1124, section label 1108, and paragraph 1120.

Figure 12:
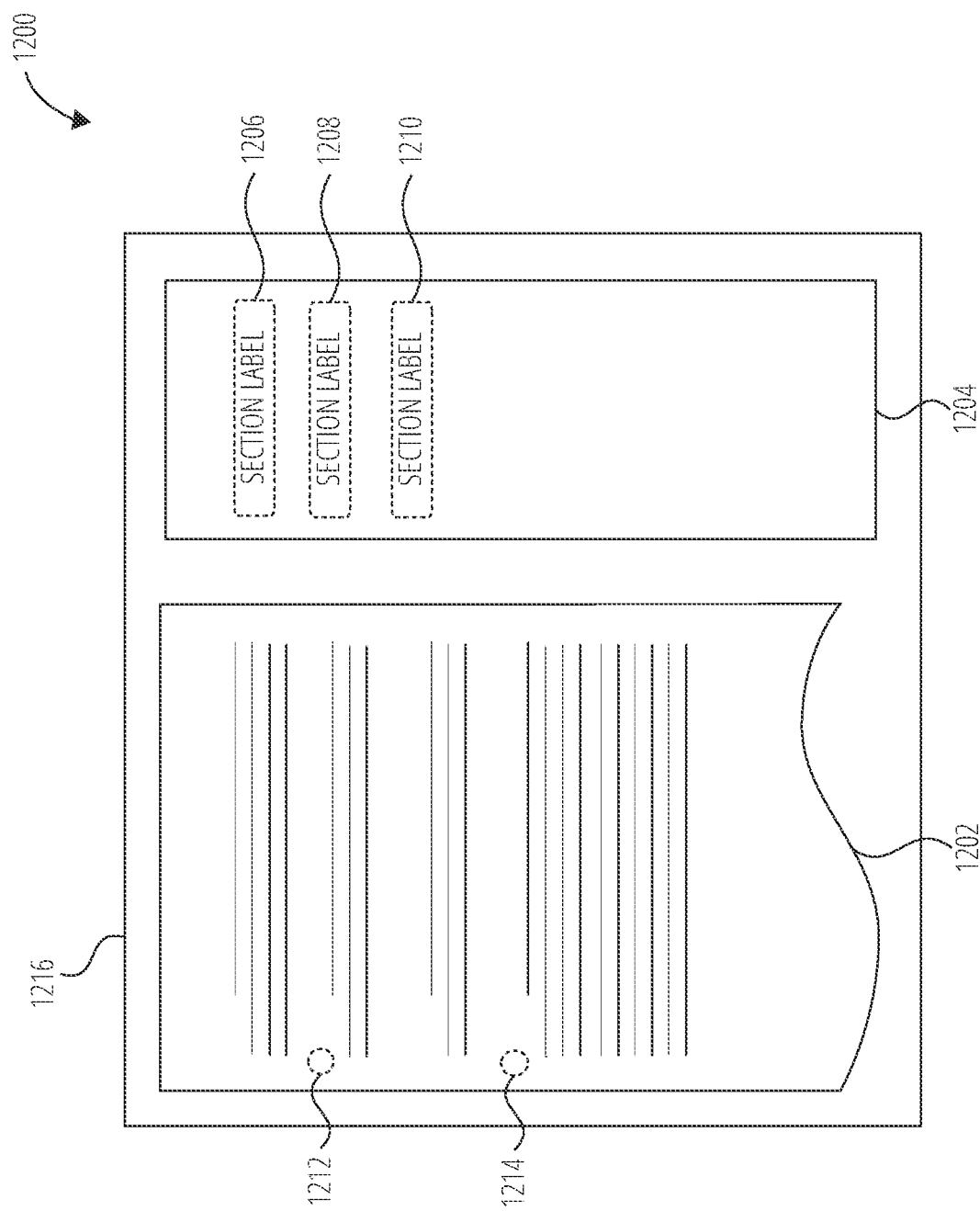
FIG. 12 illustrates an example of a graphical user interface in accordance with one example embodiment.

FIG. 12 illustrates an example of a graphical user interface 1200 in accordance with one example embodiment. The graphical user interface 1200 depicts a document authoring application user interface 1216 of the document authoring application 122, the programmatic client 108, or the web client 110.

The document authoring application user interface 1216 includes a text user interface 1202 and an outline user interface 1204. The text user interface 1202 includes document control item 1212 and document control item 1214 that identifies locations of section break in the text user interface 1202.

The outline user interface 1204 lists the labels associated with each section identified in the text document (e.g., section label 1206, section label 1208, and section label 1210). For example, when the user 130 clicks on section label 1206, the text user interface 1202 automatically navigates (e.g., scrolls up or down to) to the location associated with the section label 1206.

Figure 13:
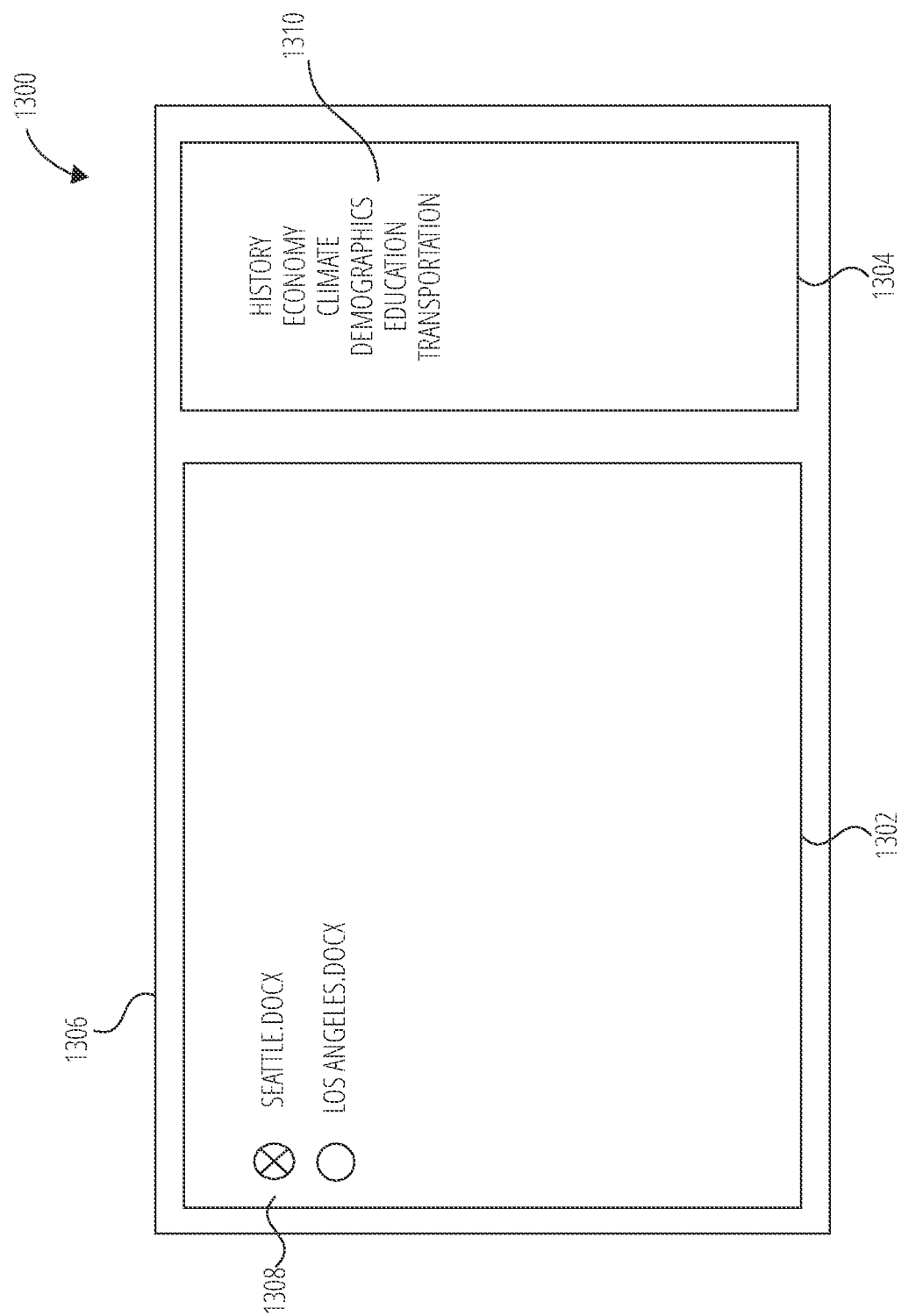
FIG. 13 illustrates an example of a graphical user interface in accordance with one example embodiment.

FIG. 13 illustrates an example of a graphical user interface 1300 in accordance with one example embodiment. The graphical user interface 1300 illustrates a user interface of the document authoring application user interface 1306. The document authoring application user interface 1306 includes a file user interface 1302 and an outline user interface 1304. For example, when the user 130 selects file 1308 (e.g., Seattle text document), a list of labels 1310 (e.g., history, economy, climate, etc.) is displayed in the outline user interface 1304. It is noted that the list of labels 1310 displays labels in order corresponding to the content in the paragraphs in the file 1308.

Figure 14:
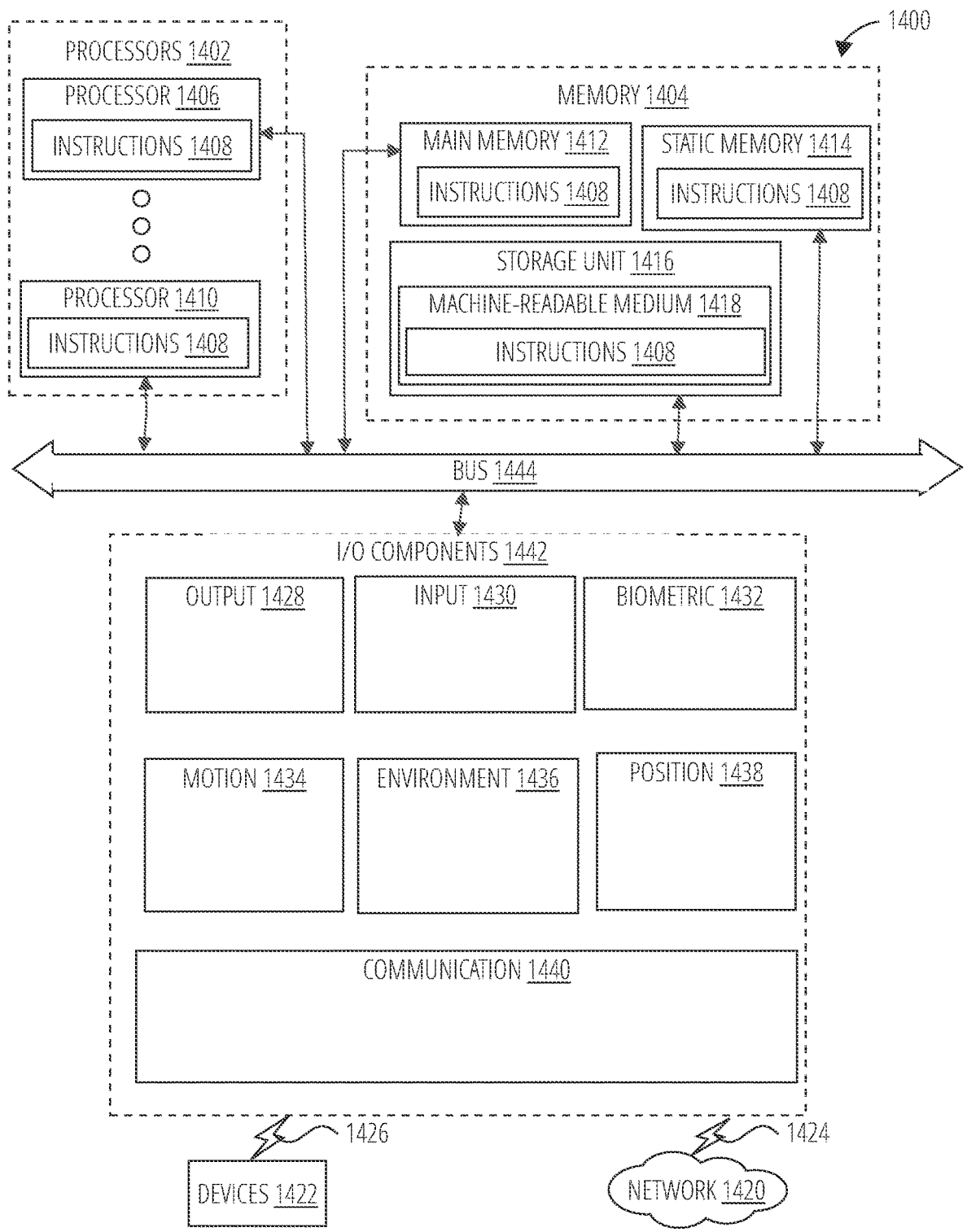
FIG. 14 is a diagrammatic representation of a machine in the form of a computer system within which a set of instructions may be executed for causing the machine to perform any one or more of the methodologies discussed herein, according to an example embodiment.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 includes processors 1402, memory 1404, and I/O components 1442, which are configured to communicate with each other via a bus 1444. In an example embodiment, the processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1406 and a Processor 1410 that execute the instructions 1408. The term "Processor" is intended to include multi-core processors that may comprise two or more independent processors (sometimes referred to as "cores") that may execute instructions contemporaneously. Although FIG. 14 shows multiple processors 1402, the machine 1400 may include a single Processor with a single core, a single Processor with multiple cores (e.g., a multi-core Processor), multiple processors with a single core, multiple processors with multiples cores, or any combination thereof.

The memory 1404 includes a main memory 1412, a static memory 1414, and a storage unit 1416, both accessible to the processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the Processor's cache memory), or any suitable combination thereof, during execution thereof by the machine 1400.

The I/O components 1442 may include a wide variety of components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various example embodiments, the I/O components 1442 may include output components 1428 and input components 1430. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface Component or another suitable device to interface with the network 1420. In further examples, the communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface Component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 includes a computer-implemented method comprising: accessing a text document; extracting a portion of the text document, the portion comprising some but not all of the text document; sending the portion of the text document to a trained machine learning model and, in response, receiving a classification of the portion as demarking a section break; modifying the text document by inserting a document control item into the text document at a location of the portion classified as demarking a section break; and storing the modified document.

Example 2 includes example 1, further comprising: computing, for the section, a label from a plurality of specified labels; and storing the label in association with the document control item.

Example 3 includes any of the above examples, further comprising: distributing the modified document to at least one computing device by: sending the label and associated document control item to the computing device; receiving user input selecting the label and associated document control item; and sending the section associated with the document control item to the computing device.

Example 4 includes any of the above examples, further comprising: presenting the label in a first user interface of a document editing application; receiving a single user-action that selects the label in the first user interface; in response to receiving the single user-action, using the document control item associated with the label to retrieve the section corresponding to the label; and rendering the section in a second user interface of the document editing application.

Example 5 includes any of the above examples, further comprising: presenting the label in a user interface of a document editing application; receiving a single user-action that selects the label in the user interface; in response to receiving the single user-action, retrieving the section corresponding to the label using the document control item associated with the label; and rendering the section in the user interface of the document editing application.

Example 6 includes any of the above examples, further comprising: training the machine learning model using a plurality of text documents that comprise section breaks.

Example 7 includes any of the above examples, further comprising: training the machine learning model using a plurality of text documents that comprise section breaks and associated labels.

Example 8 includes any of the above examples, wherein the trained machine learning model comprises a first machine learning model configured to classify a portion as demarking a section break or not, and a second machine learning model configured to classify a section of the text document into one of a plurality of possible classes, each class being a section label.

Example 9 includes any of the above examples, wherein the first and second machine learning models are combined into a single machine learning model.

Example 10 includes any of the above examples, further comprising: extracting the portion by dividing the text document into a sequence of portions, and wherein sending the portion of the text document to the trained machine learning model further comprises: sending the portion together with a first portion immediately previous in the sequence and a second portion immediately subsequent in the sequence.

Example 11 includes any of the above examples, further comprising: forming an outline section of the modified text document based on the document control items and the labels, the outline section comprising the labels; receiving a request to render the outline section; in response to receiving the request, rendering the outline section; receiving a selected label of the plurality of labels; identifying the document control item corresponding to the selected label; and in response to receiving the selected label, rendering a section of the document corresponding to the selected label using the document control item.

Example 12 includes any of the above examples, wherein the document control item controls rendering of the text document before the document control item independently from rendering of the text document after the document control item.

Example 13 includes any of the above examples, further comprising: presenting a candidate document control item to a user using the received classification; and modifying the document by inserting the document control item only if the candidate document control item is selected by the user.

Example 14 is a computer-readable storage medium, the computer-readable storage medium including instructions that when executed by a computer, cause the computer to perform operations implementing the method of any of the above examples.

Example 15 is a computing apparatus comprising: a Processor; and a memory storing instructions that, when executed by the Processor, configure the apparatus to perform operations comprising: accessing a text document; extracting a plurality of portions of the text document, a portion comprising some but not all of the text document; sending each portion of the text document to a trained machine learning model and receiving in response a classification of the portion as demarking a section break or not; modifying the document by inserting a document control item into the text document at a location of each portion classified as demarking a section break, wherein each document control item controls rendering of the text document before the document control item independently from rendering of the text document after the document control item, such that the document comprises a plurality of sections; and storing the modified document.

What is claimed is:

1. A computer-implemented method comprising:
accessing a text document;
extracting a portion of the text document, the portion comprising some but not all of the text document;
sending the portion of the text document to a trained machine learning model and, in response, receiving a classification of the portion as demarking a section break;
computing, for the portion, a label from a plurality of specified labels;
modifying the text document by inserting a document control item into the text document at a location of the portion classified as demarking the section break, the document control item corresponding to the label;
storing the modified document;
displaying, in a first user pane of a document editing application, a file name of the modified document;
detecting a selection of the file name of the modified text document in the first user pane;
in response to detecting the selection of the file name in the first user pane, displaying, in a second user pane of the document editing application, the label corresponding to the document control item of the modified document;
detecting a selection of the label in the second user pane;
in response to detecting the selection of the label, identifying the document control item corresponding to the label and rendering, in the first user pane, the portion of the text document corresponding to the document control item.

2. The computer-implemented method of claim 1, further comprising:
distributing the modified document to at least one computing device by:
sending the label and associated document control item to the computing device;
receiving user input selecting the label and associated document control item; and
sending the section associated with the document control item to the computing device.

3. The computer-implemented method of claim 1, further comprising:
presenting the label in a user interface of the document editing application;
receiving a single user-action that selects the label in the user interface;
in response to receiving the single user-action, retrieving the section corresponding to the label using the document control item associated with the label; and
rendering the section in the user interface of the document editing application.

4. The computer-implemented method of claim 1 comprising:
training the machine learning model using a plurality of text documents that comprise section breaks.

5. The computer-implemented method of claim 1, further comprising:
training the machine learning model using a plurality of text documents that comprise section breaks and associated labels.

6. The computer-implemented method of claim 1, wherein the trained machine learning model comprises a first machine learning model configured to classify a portion as remarking a section break or not, and a second machine learning model configured to classify a section of the text document into one of a plurality of possible classes, each class being a section label.

7. The computer-implemented method of claim 6 wherein the first and second machine learning models are combined into a single machine learning model.

8. The computer-implemented method of claim 1 further comprising:
  extracting the portion by dividing the text document into a sequence of portions, and
  wherein sending the portion of the text document to the trained machine learning model further comprises:
  sending the portion together with a first portion immediately previous in the sequence and a second portion immediately subsequent in the sequence.

9. The computer-implemented method of any preceding claim, further comprising:
  forming an outline section of the modified text document based on the document control items and the labels, the outline section comprising the labels;
  receiving a request to render the outline section;
  in response to receiving the request, rendering the outline section;
  receiving a selected label of the plurality of labels;
  identifying the document control item corresponding to the selected label; and
  in response to receiving the selected label, rendering a section of the document corresponding to the selected label using the document control item.

10. The computer-implemented method of claim 1, wherein the document control item controls rendering of the text document before the document control item independently from rendering of the text document after the document control item.

11. The computer-implemented method of claim 1 further comprising:
  presenting a candidate document control item to a user using the received classification; and
  modifying the document by inserting the document control item only if the candidate document control item is selected by the user.

12. A computer-readable storage medium, the computer-readable storage medium including instructions that when executed by a computer, cause the computer to perform operations comprising:
  accessing a text document;
  extracting a portion of the text document, the portion comprising some but not all of the text document;
  sending the portion of the text document to a trained machine learning model and, in response, receiving a classification of the portion as demarking a section break;
  computing, for the portion, a label from a plurality of specified labels;
  modifying the text document by inserting a document control item into the text document at a location of the portion classified as demarking the section break, the document control item corresponding to the label;
  storing the modified document;
  displaying, in a first user pane of a document editing application, a file name of the modified document;
  detecting a selection of the file name of the modified text document in the first user pane;
  in response to detecting the selection of the file name in the first user pane, displaying, in a second user pane of the document editing application, the label corresponding to the document control item of the modified document;
  detecting a selection of the label in the second user pane;
  in response to detecting the selection of the label, identifying the document control item corresponding to the label and rendering, in the first user pane, the portion of the text document corresponding to the document control item.

13. A computing apparatus comprising:
  a processor; and
  a memory storing instructions that, when executed by the processor, configure the apparatus to perform operations comprising:
  accessing a text document;
  extracting a portion of the text document, the portion comprising some but not all of the text document;
  sending the portion of the text document to a trained machine learning model and, in response, receiving a classification of the portion as demarking a section break;
  computing, for the portion, a label from a plurality of specified labels;
  modifying the text document by inserting a document control item into the text document at a location of the portion classified as demarking the section break, the document control item corresponding to the label;
  storing the modified document;
  displaying, in a first user pane of a document editing application, a file name of the modified document;
  detecting a selection of the file name of the modified text document in the first user pane;
  in response to detecting the selection of the file name in the first user pane, displaying, in a second user pane of the document editing application, the label corresponding to the document control item of the modified document;
  detecting a selection of the label in the second user pane;
  in response to detecting the selection of the label, identifying the document control item corresponding to the label and rendering, in the first user pane, the portion of the text document corresponding to the document control item.

* * * * *